United States Patent [19]

Yanai

[11] Patent Number: 4,582,175
[45] Date of Patent: Apr. 15, 1986

[54] DISC BRAKE FOR OFF-ROAD VEHICLE

[75] Inventor: Hideo Yanai, Saitama, Japan

[73] Assignee: Honda Giken Kogyo Kabushiki Kaisha, Tokyo, Japan

[21] Appl. No.: 604,105

[22] Filed: Apr. 26, 1984

[30] Foreign Application Priority Data

Apr. 26, 1983 [JP] Japan .................... 58-73440
Apr. 26, 1983 [JP] Japan .................... 58-73441
Apr. 26, 1983 [JP] Japan .................... 58-62655[U]

[51] Int. Cl.⁴ .............. F16D 55/38; F16D 65/56; F16D 65/847; G01P 1/02
[52] U.S. Cl. ...................... 188/18 A; 73/493; 73/532; 188/71.5; 188/71.6; 188/71.9; 188/72.8; 188/72.9; 188/196 C
[58] Field of Search ............. 188/18 A, 71.4, 71.5, 188/71.6, 71.8, 71.9, 72.7, 72.8, 72.9, 196 C, 196 P, 196 V, 264 W; 73/493, 532; 301/6 S, 6 E

[56] References Cited

U.S. PATENT DOCUMENTS

| 2,097,942 | 11/1937 | Whitney | 188/18 A |
| 2,308,787 | 1/1943 | Solinski | 73/493 |
| 2,976,083 | 3/1961 | Zink et al. | 188/264 W |
| 3,033,319 | 5/1962 | Wrigley et al. | 188/18 A |
| 3,628,639 | 12/1971 | Daley, Jr. | 188/196 P |

Primary Examiner—Bruce H. Stoner, Jr.
Assistant Examiner—Richard R. Diefendorf
Attorney, Agent, or Firm—Armstrong, Nikaido, Marmelstein & Kubovcik

[57] ABSTRACT

A brake for a vehicle adapted to be used for an off-road 3-wheel motor cycle or 4-wheel vehicle. This brake has a wheel, an axle rotated integrally with the wheel, a cylindrical hub rotatably engaged with the axle, a chamber formed in the hub and a multi-disc brake provided in the chamber. Thus, the brake is hardly affected by the influence of sand, mud and water scattered when the vehicle is running, and the tires and wheels can be readily cleaned when the vehicle is cleaned.

11 Claims, 7 Drawing Figures

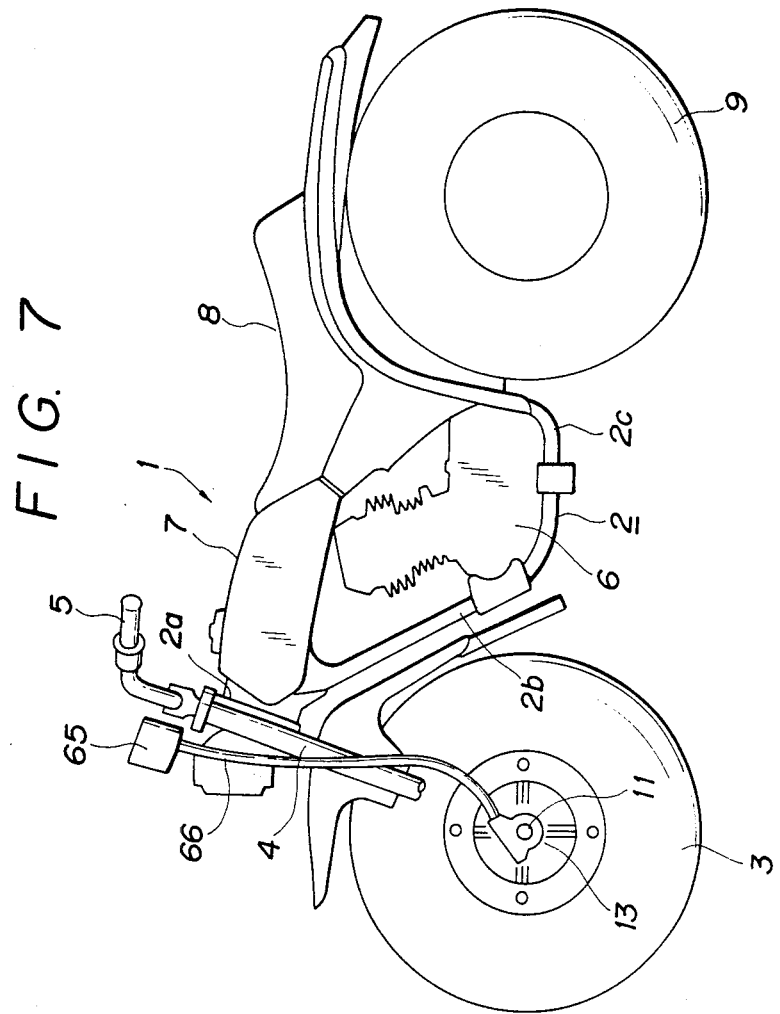

DISC BRAKE FOR OFF-ROAD VEHICLE

BACKGROUND OF THE INVENTION

1. Field of the Invention

The present invention relates to a brake for a vehicle adapted to be used for an off-road 3-wheel motor cycle or 4-wheel vehicle.

2. Description of the Prior Art

A brake mechanism for a 3-wheel motor cycle which runs on an off-road such as sandy or muddy ground should be constructed to be durable enough against the influence of sand, mud and water scattered when the motor cycle is running. Such a brake mechanism can not be an obstacle for tires and wheels when the motor cycle is cleaned.

SUMMARY OF THE INVENTION

Accordingly, it is an object of the present invention to provide a brake for a vehicle which is durable enough against the influence of sand, mud and water scattered when the vehicle are running and does not become an obstacle for tires and wheels when the vehicle is cleaned.

According to the present invention, there is provided a brake for a vehicle which comprises a wheel, an axle rotated integrally with the wheel, a cylindrical hub rotatably engaged with the axle, and a multi-disc brake provided in a chamber formed in the hub.

The above and other related objects, features and advantages of the present invention will become more apparent from the following description of the preferred embodiments of the present invention when read in connection with the accompanying drawings.

BRIEF DESCRIPTION OF THE DRAWINGS

FIG. 7 is a left side view of a 3-wheel motor cycle.

DETAILED DESCRIPTION OF THE PREFERRED EMBODIMENTS

The present invention will now be described in more detail with reference to the accompanying drawings.

Figure 1:
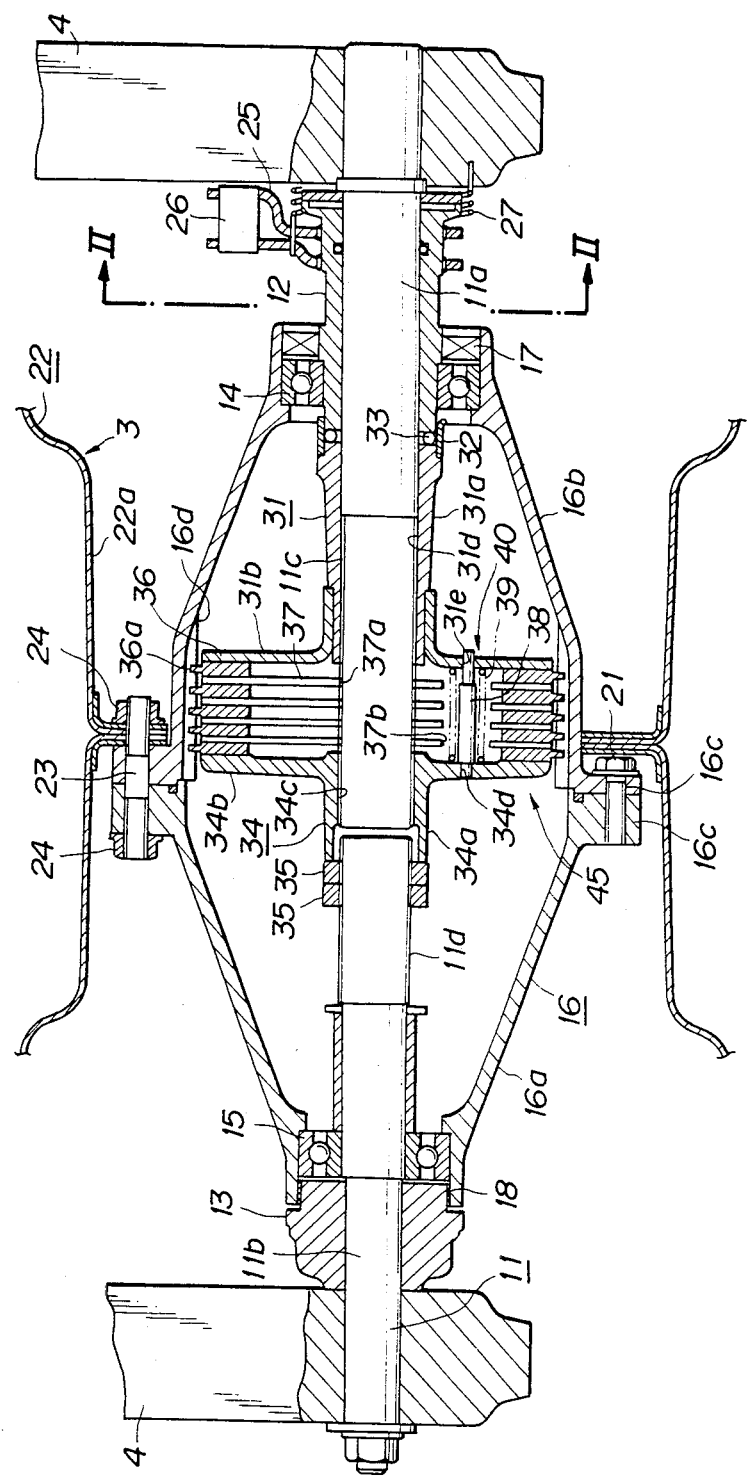
FIG. 1 is a sectional view of an embodiment of a brake for a vehicle according to the present invention.

FIG. 7 shows a left side view of a 3-wheel motor vehicle, and FIG. 1 shows a sectional view of an embodiment of a brake mechanism according to the present invention.

A head tube 2a, FIG. 7, is provided at the front end of a body frame 2 in a 3-wheel motor cycle 1, the tops of front forks 4, 4 for supporting a front wheel 3 are supported in a manner capable of being steered by the head tube 2a, a bar handle 5 is provided at the top of the head tube 2a, and the front wheel 3 is provided to be rotatable.

The body frame 2 is composed of a main pipe extending from the rear top of the head tube 2a backwardly, a dwon tube 2b extending from the rear bottom of the head tube 2a obliquely downwardly, and a down tube 2c extending from the lower end of the down tube 2b backwardly. An engine 6 is carried on the body frame 2. A fuel tank 7 and a seat 8 are placed on the body frame 2. Two rear wheels 9, 9 which are drive wheels are arranged at the oblique down portion of the seat 8. In the embodiment, balloon tires are mounted on the front wheel 3 and the rear wheels 9, 9.

The front wheel 3 is rotatably journaled at an axle 11, FIGS. 7 and 1, which is fixedly secured at its opposite ends to the lower ends of the front forks 4, 4 as shown in FIG. 1.

A cylindrical pressure cam 12 is mounted on the right end 11a of the axle 11. A collar 13 is engaged at the left end 11b of the axle 11 in contact at the outer end thereof with the lower end of the front fork 4. A rotation detecting sensor is associated with the collar 13.

Bearings 14, 15 are, respectively, engaged with the intermediate portion of the pressure cam 12 and a predetermined position of the axle 11 at the inner end of the collar 13. Cylindrical hub 16 is engaged at its opposite ends with the bearings 14, 15. Sealing members 17, 18 are, respectively, mounted at the opposite ends of the hub 16 so as to seal the hub 16.

The hub 16 is split into left and right half units 16a, 16b, which are respectively clamped by bolts 21 to the central flanges 16c, 16c. The inner edge of the rim 22a of a wheel 22 for mounting the baloon tire and the central flanges 16c, 16c are coupled via a bolt 23 and nuts 24, 24. Spline 16d is formed on the inner peripheral surface of the right half unit 16b in the vicinity of the central flange 16c.

Figure 2:
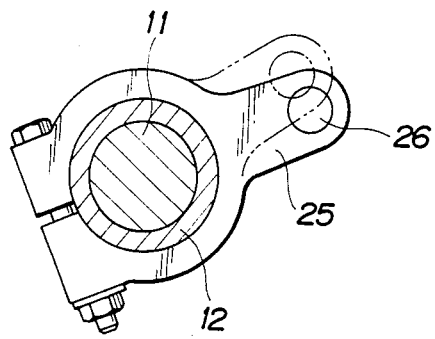
FIG. 2 is a sectional view taken along the line II—II in FIG. 1.

The base of arm 25 is fixedly secured, as shown in FIG. 2, to the vicinity of the outer end of the pressure cam 12. End 26 of a brake cable is coupled to the end of the arm 25 in such a manner that the pressure cam 12 is rotatably by the operation of the brake, and the arm 25 is urged by a return spring 27, FIG. 1, so that the pressure cam 12 is returned.

Figure 3:
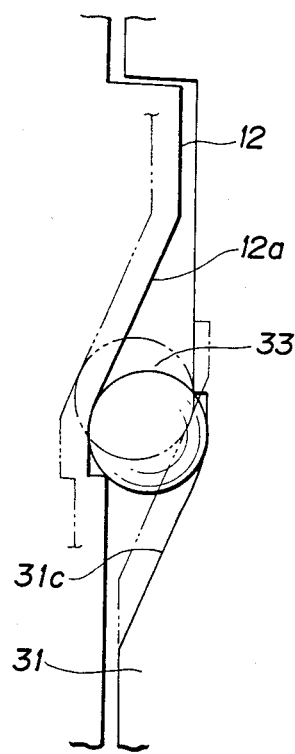
FIG. 3 is an enlarged view of the essential portion of a pressure cam.

A cam surface 12a, gradually differentiated in its axial height along the circumferential direction, is formed, as shown in FIG. 3, at the inner end of the pressure cam 12.

A pressure plate 31, FIG. 1, is arranged on the inner side of the pressure cam 12.

Pressure plate 31 has a cylindrical body 31a and an annular plate 31b fusion-bonded to the inner end of the body 31a. A cam surface 31c corresponding to the cam surface 12a is formed on the outer end of the body 31a, and steel balls 33, . . . are inserted through a supporting piece 32 between the cam surfaces 12a and 31c.

A spline 31d is formed on the inner peripheral surface of the body 31a, and engages spline 11c formed at the intermediate portion of the axle 11 to inhibit the rotation of the pressure plate 31 and to allow the axial movement of the pressure plate 31 through the cam surfaces 12a, 31c and the steel balls 33 by means of the rotation of the pressure cam 12.

Pressure plate 34 is arranged oppositely to the pressure plate 31 on the axle 11.

The pressure plate 34 has a cylindrical body 34a and an annular plate portion 34b increased in diameter from the inner end of the body 34a.

A spline 34c is formed on the inner peripheral surface of the body 34a to engage the spline 11c of the axle 11 and the spline 34c so as to thereby inhibit the rotation of pressure plate 34. Lock nuts 35, 35 are engaged with the threaded part 11d formed on the left portion of the spline 11c to thereby prohibit the leftward movement of the driven pressure plate 34.

A plurality of rotor plates 36 and a plurality of stator plates 37 are respectively interposed between the the plate portion 31b of the pressure plate 31 and the plate portion 34b of pressure plate 34.

The rotor plate 36 is formed of an annular plate, is constructed to engage at the outer peripheral, portion 36a thereof with the splined portion 16d so as to integrally rotate with the hub 16. The stator plate 37 is constructed to engage at the inner peripheral portion 37a thereof with the spline 11c so as to inhibit the rotation. The rotor plate 36 are arranged to be superposed alternately with stator plate 37.

Elastic means 40 having a supporting shaft 38 and a coil spring 39 is provided to be inserted into the hole 37b of the stator plate 37, parallel to the axle 11 inward the inner periphery of the rotor plate 36 and between the plate portions 31b and 34b.

The supporting shaft 38 is engaged fixedly at the left end thereof with the hole 34d of the plate portion 34, engaged movably at the right end thereof with the hole 31e of the plate portion 31b, and a coil spring 39 for urging in a direction to separate the plate portions 31b and 34b is wound on the shaft 38.

A brake mechanism 38 is composed of the pressure cam 12, the pressure plate 31, the driven pressure plate 34, the rotor plate 36 and the stator plate 37.

In the drawings, FIG. 7, reference numeral 66 designates a meter cable, and numeral 65 denotes a meter.

Since the embodiment is thus constructed as described above, the pressure cam 12 is rotated, when the brake lever is operated, through the brake cable and the arm 25, the pressure plate 31 is moved against the elastic force of the spring 43 to the driven pressure plate 34 side by means of the cam surfaces 12a, 31c and the steel balls 33 to pressurize the rotor plates 36, . . . and the stator plates 37, . . . by the plates 31b and 34b from both sides, thereby braking the front wheel 3.

When the operation of the brake is then released, the arm 25 and the pressure cam 12 are rotated by means of the return spring 27 to be returned to the original state, and the pressure plate 31 is moved to the outward left side by means of the spring 43 to be returned to the original state.

As described above, since the brake mechanism 45 is associated in the chamber formed in the hub 16, sand, mud and water scattered when the motor cycle is running are not introduced into the hub 16, thereby reducing the influence of the sand, mud and water to the brake mechanism 45, and the durability of the brake mechanism 45 can be further enhanced.

Since the pressure plate 31, the driven pressure plate 34, the rotor plate 36 and the stator plate 37 are provided in the hub 16 so as not to expose them out of the hub 16 and the wheels 22, the brake mechanism 45 does not become an obstacle when the motor cycle is cleaned, and the tires, wheels 22 and the hubs 16 may be simply and effectively cleaned.

As the inner space of the wheel rim 22a is dead and the hub 16 may be formed in any shape, the capacity of the brake can be readily varied by altering the shapes and numbers of the pressure plates 31, the rotor plates 36, and the stator plates 37, thereby providing a variety of brake mechanisms 45 for various types of vehicles.

Figure 4:
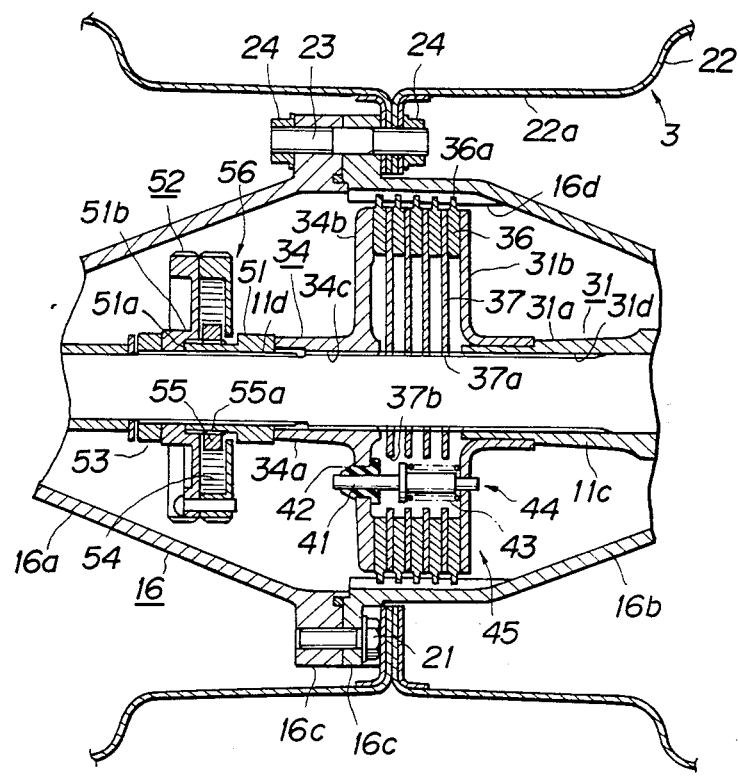
FIG. 4 is a sectional view of a multi-disc brake mechanism.
Figure 5:
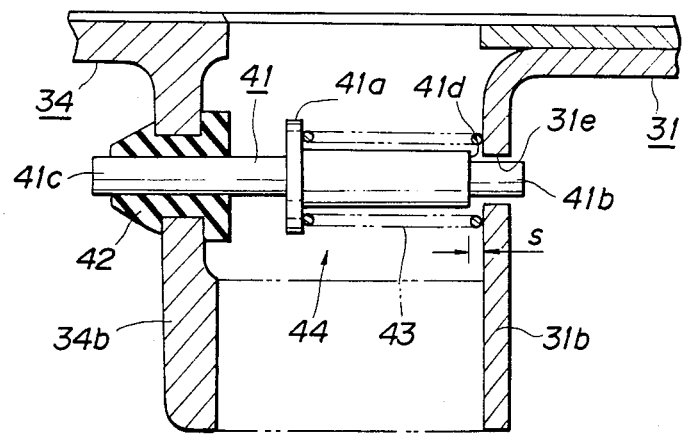
FIG. 5 is an enlarged view of second automatic adjusting means.

FIGS. 4 and 5 show a second embodiment of a brake for a vehicle according to the present invention, in which first automatic adjusting means 56 and second automatic adjusting means 44 are provided in the brake mechanism 45. In FIGS. 4 and 5, the new reference numerals are only used for the first and second automatic adjusting means 56, 44 and the same numerals as the above mentioned first embodiment are used for the other members.

The supporting shaft 41 which is inserted into the hole 37b of a stator plate 37, parallel to an axle 11 is provided inward the inner periphery of a rotor plate 36 between plate portions 31b of a pressure plate 31 and 34b of a driven pressure plate 34.

The shaft 41 has at the intermediate part thereof a large-diameter flange 41a, and at the right end thereof a small-diameter portion 41b, which is movably engaged with the guide hole 31e perforated at the plate portion 31b of the pressure plate 31. The left end shaft part 41c of the shaft 41 is inserted into an annular elastic member 42 as a grommet engaged with the plate portion 34b of the driven pressure plate 34, and supported by the elastic member 42.

A coil spring 43 is provided to be wound on the shaft 41 between the flange 41a of the shaft 41 and the plate portion 31b to thereby outwardly urge the pressure plate 31. The pressure plate 31 is thus automatically returned to the original position after the operation of the brake is released.

The coil spring 43 is formed, as shown in FIG. 5, to have a free length when an interval S between the step 41d formed at the base side of the small-diameter portion 41b of the shaft 41 and the plate portion 31b becomes a predetermined value, i.e., approx. 1 mm in this embodiment. The left end shaft part 41c is held by and engaged with the elastic member 42 by means of frictional force in such a manner to be slid in the elastic member 42 only when the pressure plate 31 is moved to the driven pressure plate 34 side by the operation of the brake so that the plate portion 31b makes contact with the step 41d so as to move shaft 41 to the left.

The first automatic adjusting means 56 is composed of a nut member 51, a spring holder 52, a spring 54 and a spring guide 55.

A threaded part 11d is formed on a predetermined position of an axle 11 at the left end side of the body 34a of the drive pressure plate 34. Nut member 51 is engaged with the threaded part 11d.

The nut member 51 has a body 51a extending at the outward left side, and a spline 51b is formed on the outer peripheral surface of the body 51a.

The spring holder 52 is engaged to cover the body 51a with the threaded part 11d, and clamped by a lock nut 53 so as to decide the position and fixedly secure it.

An annular spring guide 55 which is rotatably urged by the spring 54 is provided in the spring holder 52. The inner peripheral spline 55a of the spring guide 55 is engaged with the spline 51b so as to spirally urge the nut member 51 to move the driven pressure plate 34 side by means of the spring 54 and the spring guide 55, thereby urging the driven pressure plate 34 always under a predetermined constant pressure to the pressure plate 31 side.

Since the second embodiment of the brake of the invention is thus constructed as described above, the pressure cam 12 is rotated, when the brake lever is operated, through the brake cable and the arm 25. The pressure plate 31 is moved to the driven pressure plate 34 side against the elastic force of the spring 43 through the cam surfaces 12a, 31c and the steel balls 33 so as to pressurize the rotor plates 36, . . . and the stator plates 37, . . . by means of the plate portions 31b, 34b from both sides, thereby braking the front wheel 3.

When the operation of the brake is then released, the arm 25 and the pressure cam 12 are rotated to be returned to the original state by means of the return spring 27, and the pressure plate 31 is moved to the outward right side to the original state by means of the spring 43.

Then, the operation of the first and second automatic adjusting means 56, 44 when the rotor plates 36 and the stator plates 37 are worn will now be described.

The pressure plate 31 is moved to the pressure plate 34 side by the operation of the brake, the rotor plates 36, . . . and the stator plates 37, . . . are pressurized from both sides by means of the plate portions 31b, 34b so as to brake the front wheel 3. At this time, assume that the total thickness of the rotor plates 36 and the stator plates 37 is reduced by t mm.

The interval S is obtained between the step 41d and the plate portion 31b by the elastic force of the spring 43 as shown in FIG. 5, but the plate portion 31b makes contact with the step 41d by the movement of the pressure plate 31 by means of the operation of the brake so as to thus move the shaft 41 to the pressure plate 34 side by t mm, the left end shaft part 41c is moved by t mm leftwardly in the elastic member 42, the rotor plates 35 and the stator plates 37 are pressurized from both sides by the plate portions 31b, 34b, thereby braking the front wheel 3.

When the operation of the brake is then released, the pressure plate 31 is moved to the pressure cam 12 side by means of the elastic force of the spring 43, the pressure plate 31 is stopped moving toward the pressure cam 12 side in the state that the interval S between the step 41d and the plate portion 31b becomes S, and the interval between the rotor plates 36, . . . and the stator plates 37, . . . provided between the pressure plate 31 and the pressure plate 34 is maintained always at a predetermined constant value, irrespective of the wear, by means of the operation of the second automatic adjusting means 44.

Then, the returning operation of the pressure plate 31 by the spring 43 is stopped in the state that the interval between the step 41d and the plate portion 31b becomes S, but since the pressure plate 31 has moved to the pressure plate 34 side by t mm from the initial state, an interval of t mm is produced as a whole between the cam surfaces 12a, 31c and the steel balls 33, the nut number 51 is threaded to block the interval by the operation of the spring 54 to move to the pressure cam 12 side, so as to thereby move the entirety of the pressure plate 34, the rotor plates 36, the stator plates 37, the pressure plate 31 and the shaft 41 to the pressure cam 12 side by t mm.

Therefore, even if the rotor plates 36 and the stator plates 37 are worn, no interval is produced between the pressure plate 31 and the pressure cam 12 by the operation of the first automatic adjusting means 56, thereby maintaining the stroke of the brake lever constant.

In the second embodiment described above, the second automatic adjusting means 44 is provided together with the first automatic adjusting means 56. However, the front wheel 3 may be braked irrespective of the wear of the rotor plates 36 even when the second automatic adjusting means 44 is not provided if a spring is provided to separate at a predetermined distance between the pressure plate 31 and the driven pressure plate 34.

Therefore, according to the second embodiment of the brake of the invention, since the brake mechanism 45 and the first automatic adjusting means 56 are provided by utilizing the axle 11, the brake mechanism 45 and the first automatic adjusting means 56 may be arranged inside the wheel rim 22a and between the front forks 4 and 4, providing an excellent external appearance. Since the respective members are provided by utilizing the axle 11 in this second embodiment, the number of the members can be reduced, and the structure can be compactly formed, and the durability of the respective mechanisms can be enhanced by covering the brake mechanism 45, the first automatic adjusting means 56 and the second automatic adjusting means 44 with the hub 15 to thereby prevent dusts from mixing therewith. Since the adjustment of the brake can be effectively and automatically performed by the operation of the first automatic adjusting means 56 and the interval between the rotor plates 36 and the stator plates 37 may be maintained constantly by the operation of the second automatic adjusting means 44, the adjustment of the brake is unnecessary to be advantageous in maintenance of the brake.

Figure 6:
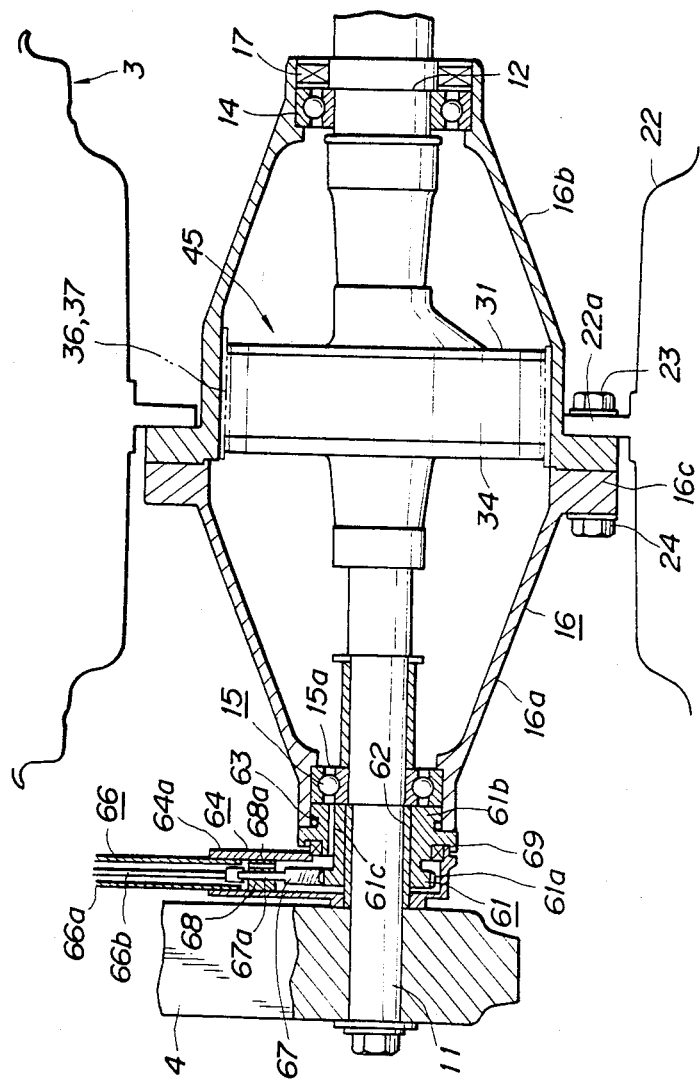
FIG. 6 is a sectional view of a brake mechanism having a breather mechanism.

FIG. 6 shows a third embodiment of a brake for a vehicle according to the present invention. In this embodiment, a breather mechanism is provided at the outer end of a hub 16. In FIG. 6, the new reference numerals are only used for the breather mechanism and the same numerals as the above mentioned first embodiment are used for the other members. The breather mechanism will now be described in detail.

A meter gear 61 which rotates integrally with the hub 16 is rotatably engaged with an axle 11 through a bushing 62 at the outside of the bearing 15 of the left side.

The meter gear 61 has a gear 61b and a boss 61b. The meter gear 61 is provided so that the inner end of the boss 61b is disposed outside the bearing 15 and the outer peripheral part of the inner end of the boss 61b is inserted through an O-ring 63 into the left end of the hub 16 so as to seal the hub 16.

A meter box 64 is provided to cover the gear 61a of the meter gear 61 between the lower end of the front fork 4 of the left side and the left end of the hub 16.

The meter box 64 is mounted so as not to turn with the axle 11, and the inner end is sealed and engaged to the outer end of the boss 61b through a sealing member 69.

A cylindrical wall 64a projecting obliquely upwardly is formed in the vicinity of the left front fork 4 of the meter box 64 to engage the end of the meter cable 66 connected to a speedometer and a running meter provided in front of the handle 5 within the cylindrical wall 64a.

The meter cable 66 has an outer cable 66a and an inner cable 66b. A pinion 67 is connected to the end of the inner cable 66b to rotate integrally therewith. The pinion 67 is engaged with the gear 61a, so as to rotatably support the end 67a of the pinion 67 by the bush 68 engaged within the cylindrical wall 64a.

A through hole 61c is formed in the boss 61b of the meter gear 61 so that the inner end is opened with the gap between the outer portion and the inner portion of the bearing 15 to communicate between the interior of the hub 16 and the interior of the gear box 64. A through hole 68a is formed at the bushing 68 to communicate between the interior of the meter cable 66 and the interior of the gear box 64.

Since this third embodiment is thus constructed as described above, an internal pressure is, when rising due to heat produced by the operation of the brake, introduced through the gap 15a of the bearing 15 and the hole 61c into the gear box 64, then from the gear box 64 through the hole 68a into the meter cable 66 and vented from suitable portion of the meter 65 into the atmosphere. Therefore, the pressure in the hub 16 can be maintained at constant value.

Since the pressure in the hub 16 is vented by utilizing the meter gear box 64 and the meter cable 66, the pressure in the hub 16 may be vented without providing separate venting means, thereby reducing the cost of the brake, simplifying the structure without increasing in size the hub 16 and the meter gear box 64.

What is claimed is:

1. A brake for a vehicle comprising a wheel, an axle rotatably supporting said wheel, a cylindrical hub rotatably engaged with the axle, a chamber formed in said hub, a multi-disc brake in said chamber, said multi-disc brake comprises an arm urged by a return spring, a pressure cam rotated by said arm, a first pressure element moved by said pressure cam, second pressure element provided oppositely to said first pressure element, and a plurality of pressure means provided between said first pressure element and said second pressure element, said first pressure element and said second pressure element being slidably mounted on said axle and a first automatic adjusting means fixedly secured to said axle in contact at one end thereof with said second pressure element for urging said second pressure element, said first pressure element and said pressure means toward said pressure cam to maintain the interval between said pressure elements and said pressure cam constant.

2. The brake for a vehicle according to claim 1, wherein said first automatic adjusting means comprises a nut member slidably secured to said axle for contacting at one end thereof with the outer axial end of said second pressure element, a spring for urging said nut member, a spring guide for transmitting the urging force of said spring to said nut member, and a spring holder for holding said spring.

3. The brake for a vehicle according to claim 1, including a second automatic adjusting means for holding the spacing between said pressure elements constant, said second pressure element and said plurality of pressure means being substantially parallel to said axle.

4. The brake for a vehicle according to claim 3, wherein said second automatic adjusting means is a supporting shaft supported at the ends thereof to said first pressure element and said second pressure element and extends substantially parallel to said axle, a spring wound on said supporting shaft, and an elastic member for holding the second pressure element side end of said supporting shaft by means of frictional force.

5. The brake for a vehicle according to claim 4, wherein said second automatic adjusting means comprises a radial flange for holding one end of said spring at its longitudinal center on said axle.

6. The brake for a vehicle according to claim 4, wherein said second automatic adjusting means includes a grommet of elastic material.

7. The brake for a vehicle according to claim 1, wherein said pressure cam comprises an oblique first end, said first pressure element comprises a second end opposite to said pressure cam, and steel balls are inserted through a supporting piece between said first end and said second end.

8. The brake for a vehicle according to claim 1, further comprising a breather mechanism fixedly secured to said axle at the outer end of said hub.

9. The brake for a vehicle according to claim 8, wherein said hub comprises a meter gear connected at one end thereof to the outer end of said hub, a meter gear box mounted at one end thereof to the other end of said meter gear, and a meter cable mounted at the other end of said meter gear box, said breather mechanism comprises a through hole formed at said meter gear and a through hole formed at said meter gear box.

10. The brake for a vehicle according to claim 1, wherein sealing means for sealing said chamber in said hub is provided at at least one end of said hub.

11. The brake for a vehicle according to claim 1, wherein said hub comprises split units.

* * * * *